United States Patent [19]

Heierli

[11] Patent Number: 5,338,409

[45] Date of Patent: Aug. 16, 1994

[54] APPARATUS FOR DISTILLING LIQUIDS IN A VACUUM

[75] Inventor: Jacob Heierli, Grub, Switzerland

[73] Assignee: MLS Mikrowellen-Labor-Systeme GmbH, Leutkirch, Fed. Rep. of Germany

[21] Appl. No.: 910,027

[22] PCT Filed: Nov. 28, 1991

[86] PCT No.: PCT/EP91/02255

§ 371 Date: Jul. 23, 1992

§ 102(e) Date: Jul. 23, 1992

[87] PCT Pub. No.: WO92/09351

PCT Pub. Date: Jun. 11, 1992

[30] Foreign Application Priority Data

Nov. 30, 1990 [DE] Fed. Rep. of Germany ....... 4038273

[51] Int. Cl.$^5$ .................... B01D 3/10; B01D 3/42
[52] U.S. Cl. ...................... 202/205; 159/22; 159/DIG. 16; 159/DIG. 26; 159/DIG. 40; 159/DIG. 42; 202/238; 202/242; 202/269; 203/91; 203/100; 203/DIG. 2; 203/DIG. 18; 219/687
[58] Field of Search ............... 202/248, 205, 238, 269, 202/160, 242; 203/91, 100, DIG. 18, DIG. 2, 2; 219/10.55 R, 10.55 M; 159/DIG. 16, DIG. 26, 43.1, 44, 22, DIG. 40, DIG. 42; 34/1 R

[56] References Cited

U.S. PATENT DOCUMENTS

| | | | |
|---|---|---|---|
| 2,843,535 | 7/1958 | Zaugg | 202/238 |
| 3,440,385 | 4/1969 | Smith . | |
| 3,674,422 | 7/1972 | Gray | 219/10.55 R |
| 3,845,270 | 10/1974 | Widugris, Jr. | 219/10.55 R |
| 3,849,623 | 11/1974 | Gilliat | 219/10.55 R |
| 4,131,779 | 12/1978 | Tatsukawa et al. | 219/10.55 R |
| 4,303,819 | 12/1981 | Kaufman, Jr., et al. | 219/10.55 |
| 4,313,786 | 2/1982 | Smith | 159/22 |
| 4,751,357 | 6/1988 | Boulard | 219/10.55 R |
| 4,759,825 | 7/1988 | Medvey et al. | 202/238 |
| 4,764,250 | 8/1988 | Riehl et al. | 202/238 |
| 4,780,178 | 10/1988 | Yoshida et al. | 202/238 |
| 4,826,575 | 5/1989 | Karamian | 159/DIG. 26 |
| 4,856,203 | 8/1989 | Wennerstrum | 34/68 |
| 4,868,359 | 9/1989 | Iwabuchi et al. | 219/10.55 R |
| 4,927,501 | 5/1990 | Becker | 202/269 |
| 4,940,865 | 7/1990 | Johnson et al. | 219/10.55 |

FOREIGN PATENT DOCUMENTS

| | | |
|---|---|---|
| 0356638 | 3/1990 | European Pat. Off. . |
| 0474306 | 9/1991 | European Pat. Off. ...... 219/10.55 R |
| 2916730 | 11/1979 | Fed. Rep. of Germany ... 219/10.55 R |
| 3015300 | 10/1980 | Fed. Rep. of Germany . |
| 1204128 | 8/1959 | France . |
| 63-166459 | 7/1988 | Japan . |
| 2054330 | 2/1981 | United Kingdom . |

OTHER PUBLICATIONS

Patent Abstracts of Japan vol. 012, No. 444 (C-545), Nov. 22 1988 (Mitsubishi Electric Corp.).

*Primary Examiner*—Virginia Manoharan
*Attorney, Agent, or Firm*—Fitzpatrick, Cella, Harper & Scinto

[57] ABSTRACT

There is described an apparatus for distilling liquids in a vacuum, having a receptacle for a liquid that can be connected to a vacuum pump, a heating arrangement for heating the receptacle causing the liquid to evaporate, a condenser for condensing the vapour, and a collecting vessel for the condensate. To be able to handle the apparatus quickly and more simply and to make it overall more economical and make it possible to carry out continuous distillation, the heating arrangement includes a vacuum-tight receiving chamber (1) for the receptacle (2) and a microwave generator (13, 13.1) for generating microwaves and for coupling them into the receiving chamber (1), the receiving chamber (1) has a connection (38) connectable to the condenser (8) and the vacuum pump (36), the receiving chamber (1) has an access opening (6) in its underside and a door arrangement (4, 5), is provided that can be moved vertically by means of a drive arrangement (7), to close the access opening (6) and hold the receptacle (2), and a sealing arrangement (19, 19.1) is provided on the receiving chamber (1) and/or on the door arrangement (4, 5) to close the access opening (6) in a vacuum-tight manner.

8 Claims, 3 Drawing Sheets

APPARATUS FOR DISTILLING LIQUIDS IN A VACUUM

BACKGROUND OF THE INVENTION

1. Field of the Invention

The invention relates to an apparatus for distilling liquids in a vacuum.

2. Description of the Related Art

In practice an apparatus of this kind is known which is generally referred to as rotation evaporator and is provided for use in laboratories. The receptacle of this rotation evaporator is formed as a distilling flask of glass which is rotated about its axis by means of a motor during distillation and is connected via the so-called distillation head to the condenser e.g. a product condenser such as the Liebig condenser. The so-called receiver adapter forms the connection between the condenser and the collecting vessel, the so-called receiver. The vacuum source, for example a water jet pump, is connected to the condenser in the bottom region thereof. As a heating arrangement a so-called heating bath is used, preferably having a liquid heat transfer medium that can be heated by means of an immersion heater, a gas burner or electric hot plate.

Setting up the rotation evaporator, i.e. filling the distilling flask with the liquid to be distilled, and connecting it to the receiver adapter, is time consuming and impractical, and care must be taken in particular in relation to the precision of the connecting parts, i.e. of the ground glass joint, and in careful lubrication of the latter with vacuum grease. The distilling flasks often break during distillation, as they are made of glass, so that the distillation process has to be repeated. The comparatively great inertia of the different liquid heat transfer mediums used in the heating bath allows on the one hand an appropriately accurate temperature setting, but on the other hand it requires a relatively long time for different temperatures to be set. Moreover the rotation evaporator is not suitable for carrying out continuous distillation processes.

SUMMARY OF THE INVENTION

It is the object of the invention to further develop the apparatus of the kind mentioned in the introduction so that it is not only easier and quicker to handle, and overall more economical, but it also fulfills the requirements for carrying out continuous distillation processes.

Depending on the microwave absorption properties of the materials used for the receptacle both polar and non-polar liquids can be heated extremely quickly to their respective boiling points with the apparatus according to the invention. This applies in particular to polar liquids in which heat is generated directly without heat having to be transferred from the receptacle.

The apparatus according to the invention may be set to different temperatures extremely quickly by, for example, simply switching on and off the microwave generator or by interrupting the coupling of the microwaves into the receiving chamber so that the time loss, when readjusting the apparatus for distilling liquids having different boiling points, is negligibly small.

The economy achieved with the apparatus according to the invention can be increased by the use of a power-controlled or regulated microwave generator when the liquid is quickly heated to the boiling point with a microwave radiation power that is higher than is necessary to maintain the boiling temperature. The receiving chamber of the apparatus according to the invention is closed on all sides during distillation. It thus has no free surfaces as with the heating baths used in the prior art, so that its radiation of heat is reduced with corresponding increased economy achieving the apparatus. The economy achieved by the apparatus is also improved because, when using the apparatus according to the invention, the receptacles need not necessarily be of glass, so that glass breakage and thus the need to repeat a distillation occurs correspondingly less often.

The apparatus according to the invention can furthermore be set up quickly and simply for distillation: the receptacle is placed by hand or, for example by means of a loading and unloading device, automatically on the door arrangement that is in the open position, and which is then moved by the drive arrangement into the closed position in which the receptacle is in the inside of the now closed receiving chamber. The receiving chamber can likewise be unloaded automatically. Since the connection leading to the condenser is mounted on the receiving chamber, the manual connection of the receptacle to the condenser connection, i.e. to the distillation head, necessary in the prior art is dispensed with.

By equipping the receiving chamber with a further connection that is provided to supply liquids to be distilled, it is possible to carry out distillation processes continuously. It is hereby advantageous to provide a valve to control the supply of liquid. After distillation is completed possible solid residue remaining in the receptacle can be dissolved very quickly by supplying an appropriate solvent agent with excess pressure. In this case the receiving chamber is made correspondingly pressure-tight by using a pressure-tight sealing arrangement and is provided with a pressure connection.

To enlarge the surface areas of the liquids in the receptacle when the liquids to be distilled are continuously supplied and thereby obtain an improved evaporation effect, the door arrangement according to a further development of the invention can be rotated in its plane by means of a motor; the liquid droplets striking the floor of the receptacle rotating together with the door arrangement are moved outwards due to the centrifugal force occurring as a result of rotation. Under the influence of corresponding high centrifugal forces, foaming over of liquids that have a tendency to form foam can be prevented.

As an alternative to the rotatable door arrangement one can be used that comprises a non-rotatable door element for closing the access opening and a rotatable support plate for the receptacle.

To avoid condensation effects within the receiving chamber during distillation, a hood of microwave-absorbing material is arranged in the receiving chamber in the region above the receptacle.

According to a further development of the invention a control and regulating unit to control and regulate at least one of the following components is provided: drive arrangement, microwave generator, motor, vacuum pump, compressed air pump, valve, and loading and unloading device. If all of these components are controlled or regulated, fully automatic processes as well as continuous and non-continuous distillation are possible. It is advantageous to provide a temperature and/or pressure sensor connection on the receiving chamber that leads to the control and regulating unit and makes regulation of the microwave generator and- /or of the vacuum pump and the compressed air pump possible.

BRIEF DESCRIPTION OF THE DRAWINGS

The invention will now be described in more detail with reference to two exemplary embodiments and referring to the drawings, in which.

DETAILED DESCRIPTION OF THE PREFERRED EMBODIMENTS

Figure 1:
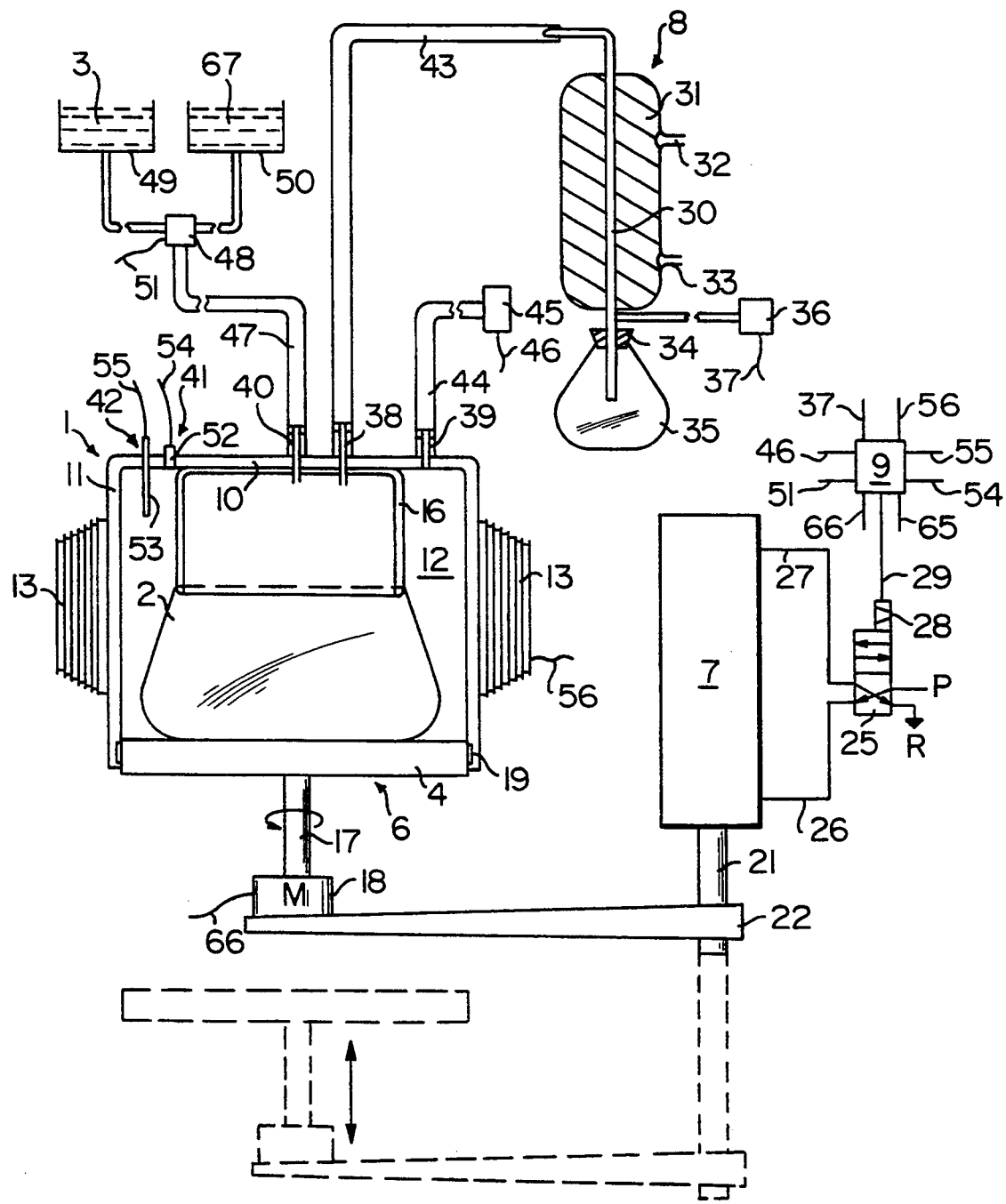
FIG. 1 shows a schematic, not to scale, sectional view of the first exemplary embodiment of the apparatus according to the invention.

The apparatus shown in the drawings is provided to distill liquids continuously in a vacuum, and includes a pressure-and vacuum-tight, microwave-reflecting receiving chamber 1 for a receptacle 2 for the liquid 3 to be distilled, a door arrangement 4 (FIG. 1) or 5 (FIGS. 2 to 4) that serves both to close an access opening 6 at the receiving chamber 1 and as carrier for the receptacle 2, a drive arrangement 7 for moving the door arrangement 4 or 5 from an open position removed from the receiving chamber 1 (broken lines in FIGS. 1 and 2) into a closed position (continuous lines in FIGS. 1 and 2) and back again, a condenser 8 connected to the receiving chamber 1 and a control- and regulating unit 9 for control and regulation of the functions of the apparatus according to the invention.

The receiving chamber 1 is formed as a vertically standing, hollow cylinder 11 of circular cross-section that is only closed on its top side with an end wall 10. Access to the interior 12 of the receiving chamber 1 occurs through the access opening 6 opposite the end wall 10, said opening having the same cross-section as the hollow cylinder 11.

In the exemplary embodiment shown in FIG. 1 a conventional microwave generator 13, of which the power can be regulated, is mounted on the outside of the hollow cylinder 11. It includes as main components (not shown) a magnetron tube connected via a transformer 14 (see FIG. 3) to a current supply for producing microwaves, and a wave guide for coupling the microwaves into the interior 12 of the receiving chamber 1. The dimensions of the wave guide are tuned in known manner to the frequency of the microwaves.

Figure 2:
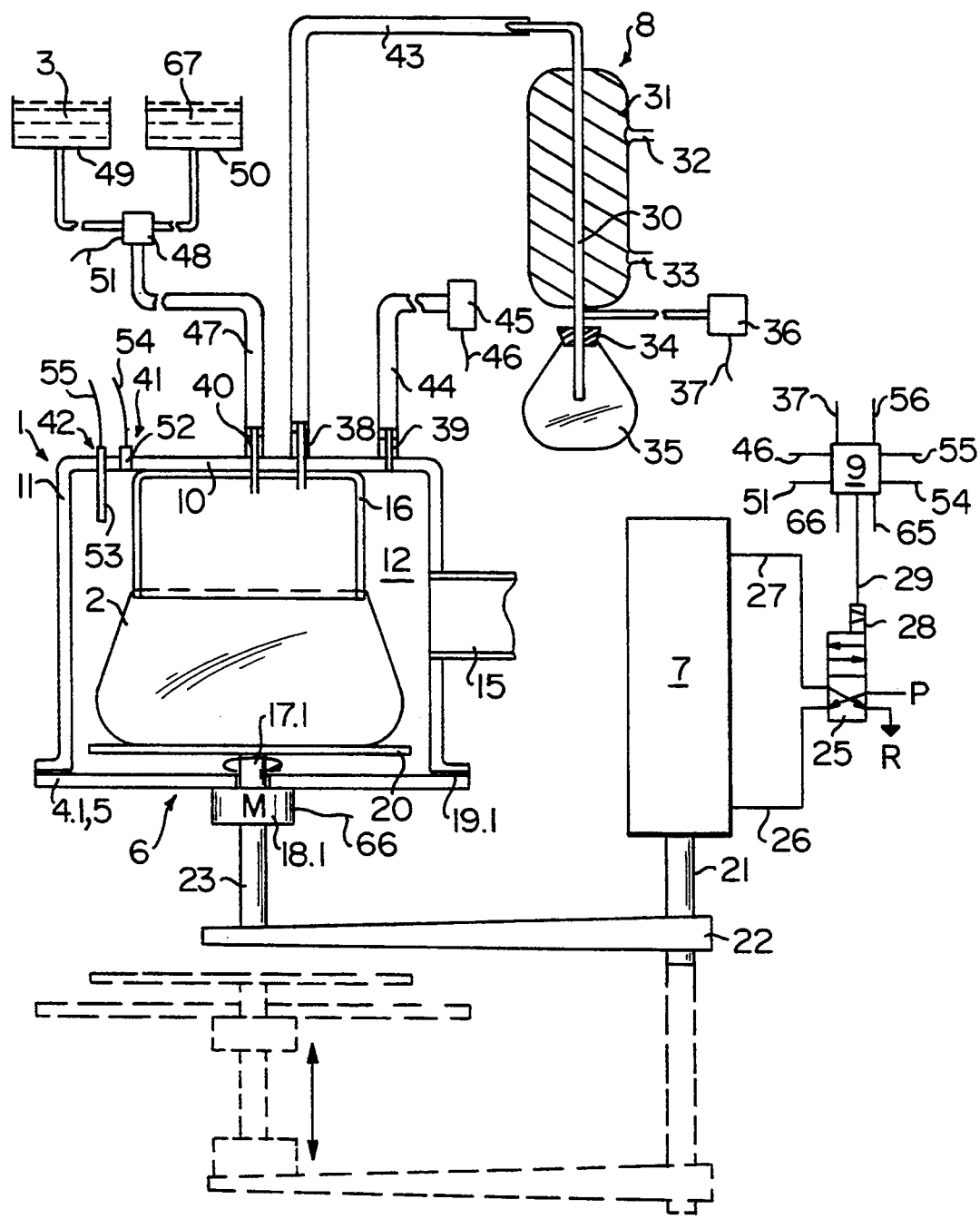
FIG. 2 shows a schematic, not to scale, sectional view of the second exemplary embodiment of the apparatus according to the invention.
Figure 3:
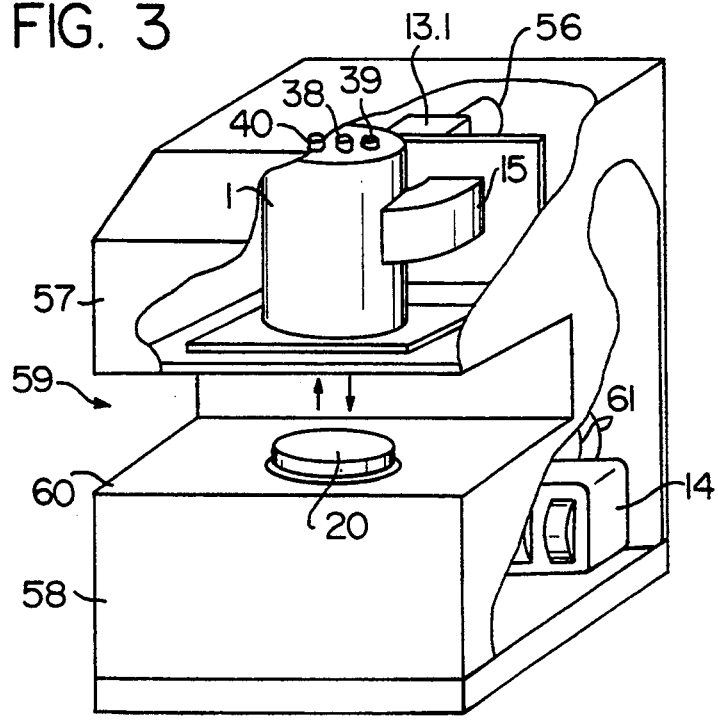
FIG. 3 shows a practical arrangement of the apparatus shown in FIG. 2 in a perspective view with a receiving chamber exposed but without a condenser.
Figure 4:
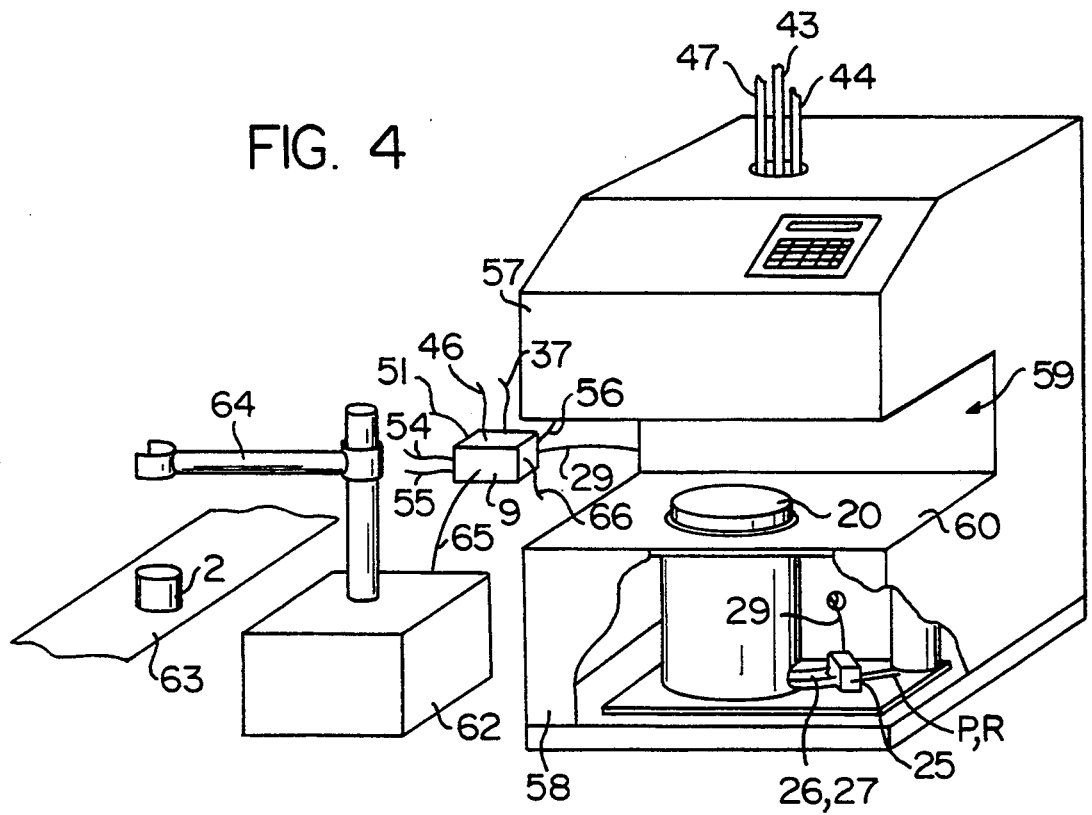
FIG. 4 shows the apparatus shown in FIG. 3 from the same view with an open door arrangement with a drive arrangement.

In FIGS. 2 to 4 the likewise conventional microwave generator indicated by the reference numeral 13.1, that can have its power regulated, is mounted apart from the receiving chamber 1. Its wave guide is formed as a wave guide duct 15 having a rectangular cross-section which leads laterally into the hollow cylinder 11.

By the selection of appropriate dimensions the receiving chamber 1 is formed in known manner as a resonator, of which the interior 12 thus represents a resonance chamber in which the coupled microwaves are totally reflected. The receiving chamber 1 is lined inside with teflon. In its interior 12 a hood 16 that is open downwards and is made of microwave absorbing material is affixed to the end wall 10 in the region above the receptacle or receptacles 2.

The door arrangement 4 shown in FIG. 1 comprises a plate-like door element (having the same reference numeral 4) of annular cross-section, of which the diameter is slightly smaller than that of the access opening 6. The door element 4 can be rotated in its plane and for this purpose is connected to the drive shaft 17 of a motor 18 associated with the drive arrangement 7. A pressure- and vacuum-tight sealing arrangement 19 is arranged on the inner periphery of the receiving chamber 1 in the region of the access opening 6, and formed so that it allows the door element 4 to rotate when it is in its closed position within the receiving chamber 1. The upper side of the door element 4 serves as standing space for the receptacle 2 and is coated with teflon.

The door arrangement 5 shown in FIGS. 2 to 4 comprises a door element 4.1 and a support plate 20. The door element 4.1 differs from the door element 4 shown in FIG. 1 in that the diameter is so much larger that, when in its closed position, it lies over the pressure- and vacuum-tight sealing arrangement (here indicated by the reference numeral 19.1) on the bottom edge of the receiving chamber 1, and cannot be rotated. The support plate 18 is of annular cross-section and arranged at a distance above the door element 4.1. The diameter of the support plate is smaller than the internal diameter of the receiving chamber 1; its upper side serves as standing space for the receptacle 2 and is coated with teflon. Moreover it can be rotated in its plane and for this purpose is connected to the drive shaft 17.1 of the motor, indicated here by the reference numeral 18.1, that is mounted to the underside of the door element 4.1. The drive shaft 17.1 passes through the door element 4.1, appropriately sealed off. The two motors 18 and 18.1 are connected via a respective control line 66 to the control and regulating unit 9.

The drive arrangement 7 comprises a double-acting pneumatic piston/cylinder unit which, as shown in FIGS. 1 and 2, is arranged in a plane parallel to the longitudinal axis of the receiving chamber 1, and engaging with its piston rod 21 is a horizontally extending cross-connection 22 to the free end of which the motor 18 of FIG. 1 is mounted. As shown in FIG. 2 a lifting rod 23 forms the connection between the free end of the cross-connection 22 and the motor 18.1 mounted on the underside of the door element 4.1. As shown in FIGS. 3 and 4 the piston/cylinder unit is arranged beneath the receiving chamber 1 in a cover 24 together with the receiving chamber (see FIG. 4) so that its piston rod engages directly with the motor 18 or 18.1 in a manner not shown.

A control valve 25 is provided for the piston/cylinder unit 7 in the form of a 4/2 way valve with electromagnetic operation and is connected via a respective compressed air connection line 26, 27 to both pressure chambers (not shown) of the piston/cylinder unit 7. The two remaining connections are an air inlet connection P and a ventilating connection R. In the first switching position, shown in FIGS. 1 and 2, the control valve 25 controls the inlet of air so that the piston of the piston/cylinder unit 7 is urged in the direction of the closed position of the door arrangement 4 or 5 via the compressed air connection line 26. In the second switching position the piston is urged via the compressed air connection line 27 in the opposite direction, i.e. in the open position direction of the door arrangement 4 or 5. The electromagnet 28 of the control valve 25 is connected via a control line 29 to the control and regulating unit 9 that is provided to control and regulate the continuous distillation process.

The condenser 8 is a product condenser of conventional design and includes a condensation tube 30 that passes through a vertically standing cooling cylinder 31 that is connected via a feed line 32 and a return line 33 to a cooling water supply (not shown). The free end of the condensation tube 30 projecting from the bottom end of the cooling cylinder 31 leads into a so-called receiver 35, passing through a stopper 34 of the latter, said receiver having the shape of a round-bottom flask and being provided to collect the condensation dripping from the condensation tube 30. The condensation tube 30 is connected in the region between the cooling cylinder 31 and the receiver 35 via a vacuum line to a vacuum pump 36 that is connected via a control line 37 to the control and regulating unit 9.

Five connections 38 to 42 are made in the end wall 10 of the receiving chamber 1. The connection 38 is connected via a connection line 43 to the condensation tube 30 and the connection 39 is connected via a compressed air line 44 to a compressed air pump 45 that is connected via a control line 46 to the control and regulating unit 9. The connection 40 leads via a supply line 47 to a flow dividing valve 48, having at least two switching positions and an adjustable through-flow cross-section, connected to two storage vessels 49, 50 via at least two branch lines. The flow dividing valve 48 is controlled via a control line 51 by the control and regulating unit 9. The connections 41 and 42 are sensor connections for a pressure sensor 52 and a temperature sensor 53. The pressure sensor 52 ends flush with the inner surface of the end wall 10 and can thus be made of metal. The metal-free temperature sensor 53 projects into the interior 12 of the receiving chamber 1. The two sensors 52, 53 are connected by respective sensor lines 54 and 55 to the control and regulating unit 9. A further control line 56 connects the microwave generator 13 or 13.1 to the control and regulating unit 9.

By the selection of appropriate dimensions and/or use of reflection-free seals, pins, diaphragms etc., it is ensured that no microwaves can escape through the connections 38, 39, 40.

The apparatus shown in FIGS. 3 and 4 includes a U-shaped housing, the limbs of which are formed by upper and lower housing parts 57 and 58 respectively, and project horizontally. The free space 59 between the two housing parts 57, 58 is open at the front side of the housing, and is freely accessible.

The receiving chamber 1 of FIG. 2, is accommodated in the upper housing part 57, and the piston/cylinder unit 7 shown in FIGS. 1 and 2 within the cover 24 and the door arrangement 5 are accommodated in the lower housing part 58. The support plate 20 of the door arrangement projects in the open position slightly above the upper side 60 of the lower housing part 58 into the free space 59. The microwave generator 13.1 in the upper housing part 57 and the transformer 14 in the lower housing part 58 are connected to one another via cables 61. The lines 43, 44 and 47 connected to the connections 38, 39 and 40 are guided out of an opening in the upper side of the upper housing part 57 (FIG. 4). Indicated in the lower housing part 58 are the pressure connection lines 26, 27, the control valve 25 and its air inlet and ventilating line P and R respectively.

FIG. 4 shows also, in a schematic representation, a loading and unloading device 62 and a conveyor belt 63.

The loading and unloading device is provided with a gripping arm that can be swivelled and lifted and lowered, and is connected via a control line 65 to the control and regulating unit 9. The receptacles 2 that are to be loaded into the receiving chamber 1 and are to be removed therefrom after the respective distillation has been completed are transported by the conveyor belt 63 to and away from the loading and unloading device 62.

The operation of the apparatus according to the invention will now be described:

At the start of the continuous distillation process the receiving chamber 1 is provided with one or several empty receptacles 2. For this purpose the loading and unloading device 62 is controlled by the control and regulating unit 9 via the control line 65 and correspondingly takes with its gripping arm 64 an empty receptacle 2 from the conveyor belt 63 and transfers it through appropriate lifting and swivelling movements of the gripping arm 64 on to the support plate 20 of the door arrangement 5 that is in the open position. As soon as the gripping arm 64 has been swivelled back into its starting position shown in FIG. 4, the electromagnet 28 is controlled by the control and regulating unit 9 via the control line 29 and thus the control valve 25 is switched from the second switching position into the first switching position shown in FIG. 2. By this means the piston of the piston/cylinder unit 7 together with the door arrangement 5 loaded with the receptacle 2 is moved upwards until the door arrangement arrives in the closed position, in which the receptacle 2 is located in the pressure- and vacuum-tight closed interior 12 of the receiving chamber 1.

To distil polar liquids the receptacles of microwave-permeable or microwave-impermeable material can be used. In the first case the liquid is heated directly through the direct influence of the microwaves and in the latter indirectly through heat transfer from the receptacle heated by the microwaves. Obviously material that is partly permeable by microwaves can be used. For the distillation of non-polar liquids indirect heating is necessary.

Now the control and regulating unit 9 controls via the control line 51 the flow dividing valve 48 that is thereby switched and has its through-flow cross-section adjusted so that liquid 3 is continuously, preferably drop-wise, supplied from the storage vessel 49 via the supply line 47 and the connection 40 to the interior 12 of the receiving chamber 1 and thus to the receptacle 2.

Almost simultaneously the motor 18.1, the vacuum pump 36 and the microwave generator 13.1 are controlled and thereby switched on by the control and regulating unit 9 via the control lines 66, 37 and 56. The switched-on microwave generator 13.1 generates microwaves that are coupled by the wave guide duct 15 into the receiving chamber 1 and which heat the liquid dripping through the connection 40 directly or indirectly (depending on its polarity and the microwave absorption properties of the receptacle). The switched-on motor 18.1 rotates the support plate 20 and thus the receptacle 2 so that the liquid 3, supplied through the connection 40, moves radially outwards on the floor of the receptacle 2 and is thus distributed. The large liquid surface area obtained in this way, together with the lowering of the boiling point by the vacuum produced by the vacuum pump 36, leads to very rapid heating and vaporization. The hood 16 heated by the coupled microwaves prevents the formation of condensation in the rising liquid vapour that is supplied through the connection 38 and the supply line 43 to the condenser 8, is condensed there in known manner on the inner surface of the condensation tube 30 and then dripped into the receiver 35.

During distillation the sensors 52, 53 generate signals proportional to the pressure and the temperature within the receiving chamber 1, that are supplied via the sensor lines 54 and 55 to the control and regulating unit 9 which, by issuing appropriate control signals via the control lines 37, 56, regulates the vacuum pump 36 and the microwave generator 13.1 to the power necessary to maintain the predetermined pressure and temperature values within the receiving chamber 1.

Distillation can be carried out continuously in the manner described above until the liquid 3 in the storage vessel 49 has been used up or until, for example, a certain amount of residue has collected in the receptacle 2. In the latter case the microwave generator 13.1 and the vacuum pump 36 are switched off by the control and regulating unit 9 via the corresponding control lines 56, 37 and the flow dividing valve 48 switched so that a solvent agent 67 for the residue in the storage vessel 50 is supplied to the receptacle 2. At the same time the control and regulating unit 9 controls the compressed air pump 45 via the control line 46 so that the pump switches on and subjects the interior 12 of the receiving chamber 1 to appropriate pressure. This pressure, together with the simultaneous rotation of the support plate 20 and thus of the receptacle 2, leads to rapid dissolving of the residue in the solvent agent 67. Subsequently the control and regulating unit 9 switches the motor 18.1 and the compressed air pump 45 off, moves the flow dividing valve 48 into its closed position and the control valve 25 into its second switching position in which the piston/cylinder unit 7 and thus the door arrangement 5 together with the receptacle 2 are moved into the open position. The gripping arm 64 then transfers the receptacle 2 with the dissolved residue to the conveyor belt 63.

If the components of the liquid have very different boiling points the condensed distillate in the condenser 8 can be collected in several receivers that are connected to the condenser 8 via a so-called spider. Rectification is also possible with the apparatus according to the invention.

If distillation is to be carried out non-continuously the receiving chamber 1 is provided by means of the loading and unloading device 62 or manually with a receptacle 2 filled with the liquid to be distilled. Distillation is carried out with the flow dividing valve 48 in the closed position and is completed when all the liquid in the receptacle 2 has evaporated.

I claim:
1. Apparatus for distilling liquids in a vacuum, said apparatus comprising,
   a distilling receptacle for a liquid to be distilled,
   a vacuum pump connected to said receptacle,
   a heating means for heating the receptacle for causing the liquid to evaporate,
   a condenser connected to the receptacle for condensing the vapor,
   at least one collecting vessel connected to the condenser, for the condensate,
   said heating means including at least one vacuum-tight and microwave-reflecting receiving chamber for the receptacle and a microwave generator connected to the receiving chamber for generating microwaves and coupling them into the receiving chamber,
   an access opening in the underside of said receiving chamber and a door means movable substantially vertically by means of a drive means between an open and a closed position, for closing the access opening and for holding the receptacle, and
   means for sealing at least one of the receiving chamber and the door means to close the access opening in a vacuum-tight manner,
   at least one support plate for the receptacle,
   means for rotating said support plate in its plane, including a motor, and
   a control and regulating unit for controlling or regulating at least one of said drive means, said microwave generator, said motor, said vacuum pump, a compressed air pump, a valve and a loading and unloading device.

2. Apparatus for distilling liquids in a vacuum, said apparatus comprising,
   at least one distilling receptacle for a liquid to be distilled,
   a vacuum pump connected to said receptacle,
   a heating means for heating the receptacle for causing the liquid to evaporate,
   a condenser connected to the receptacle for condensing the vapor,
   at least one collecting vessel connected to the condenser, for the condensate,
   said heating means including a vacuum-tight and microwave-reflecting receiving chamber for the receptacle and a microwave generator connected to the receiving chamber for generating microwaves and coupling them into the receiving chamber,
   an access opening in the underside of said receiving chamber means and a door means movable substantially vertically by means of a drive means between an open and a closed position, for closing the access opening and for holding the receptacle,
   means for sealing at least one of the receiving chamber and the door means for closing the access opening in a vacuum-tight manner,
   means for rotating said door means in its plane, including a motor, and
   a control and regulating unit for controlling or regulating at least one of said drive means, said microwave generator, said motor, said vacuum pump, a compressed air pump, a valve and a loading and unloading device.

3. Apparatus according to claim 1 or 2, further comprising a hood of microwave absorbing material connected to the receiving chamber in the region above the receptacle.

4. Apparatus according to claim 1 or 2, wherein the receiving chamber further includes a pressure connection to the compressed air pump.

5. Apparatus according to claim 1 or 2, wherein the receiving chamber further includes means for supplying liquid to be distilled.

6. Apparatus according to claim 5, and further including a valve for controlling the liquid supply.

7. Apparatus according to claim 1 or 2, wherein the receiving chamber further includes connection for receiving either of a temperature sensor or a pressure sensor.

8. Apparatus according to claim 1 or 2, wherein the loading and unloading device are for loading the receiving chamber with receptacles and for unloading said receptacles.

* * * * *